United States Patent [19]
Inoue et al.

[11] Patent Number: 5,493,414
[45] Date of Patent: Feb. 20, 1996

[54] METHOD OF DUBBING DIGITAL VIDEO SIGNALS

[75] Inventors: Hajime Inoue, Chiba; Hiroyuki Ishimaru, Tokyo; Hisato Shima, Chiba; Kazuyuki Ogawa, Kanagawa; Masaki Oguro; Ichiro Okamoto, both of Tokyo, all of Japan

[73] Assignee: Sony Corporation, Tokyo, Japan

[21] Appl. No.: 153,083

[22] Filed: Nov. 17, 1993

[30] Foreign Application Priority Data

Nov. 20, 1992 [JP] Japan ................................. 4-312474

[51] Int. Cl.$^6$ ............................................. H04N 5/76
[52] U.S. Cl. .................. 358/336; 360/38.1; 360/33.1; 358/335
[58] Field of Search ............................. 358/335, 336; 360/33.1, 38.1, 13, 14.1; 348/390; H04N 5/76, 5/78

[56] References Cited

U.S. PATENT DOCUMENTS

| | | | |
|---|---|---|---|
| 4,775,897 | 10/1988 | Umemoto et al. | 358/311 |
| 4,791,495 | 12/1988 | Umemoto et al. | 358/310 |
| 4,882,732 | 11/1989 | Kaminaga | 360/38.1 |
| 5,023,710 | 6/1991 | Kondo et al. | 358/335 |
| 5,193,010 | 3/1993 | Juri et al. | 335/336 |

FOREIGN PATENT DOCUMENTS

| | | |
|---|---|---|
| 0353757 | 2/1990 | European Pat. Off. . |
| 0415699 | 3/1991 | European Pat. Off. . |
| 0421417 | 4/1991 | European Pat. Off. . |
| 0492528 | 7/1992 | European Pat. Off. . |

OTHER PUBLICATIONS

IEEE Transactions on Consumer Electronics vol. 37, No. 3, Aug. 1991, New York US pp. 275–282 XP263196 Yoneda et al. 'An experimental digital VCR with new DCT–based bit–rate reduction system'.

Primary Examiner—Tommy P. Chin
Assistant Examiner—Khoi Truong
Attorney, Agent, or Firm—William S. Frommer

[57] ABSTRACT

A method of dubbing compressed digital video signals adopted for an apparatus for efficient coding and subsequent recording/playback of video signals. In the method of dubbing compressed digital video signals, on a playback unit side, after padding error data by an error processing circuit with respect to an error uncorrectable in error correction by an ECC circuit of playback, the digital video signal is provided with a parity for transmission by a parity generating circuit and is then transmitted to a recording unit side. On the other hand, on the recording unit side, after padding error data by an error processing circuit with respect to an error uncorrectable in error correction by an ECC circuit of transmission, the digital video signal is provided with a parity for recording by a parity generator and is then recorded in a recording medium.

10 Claims, 13 Drawing Sheets

ERROR FLAG

ERROR FLAG

METHOD OF DUBBING DIGITAL VIDEO SIGNALS

BACKGROUND OF THE INVENTION

1. Field of the Invention

This invention relates to a method of dubbing compressed digital video signals adopted for an apparatus for efficient coding and subsequent recording/playback of the video signals.

2. Description of the Related Art

Digital VTRs of various digital formats, such as D1 mode, D2 mode and D3 mode, have been commercialized for broadcasting use. For practical digital VTRs for private purposes, also, various kinds of formats have been proposed.

Figure 1A:
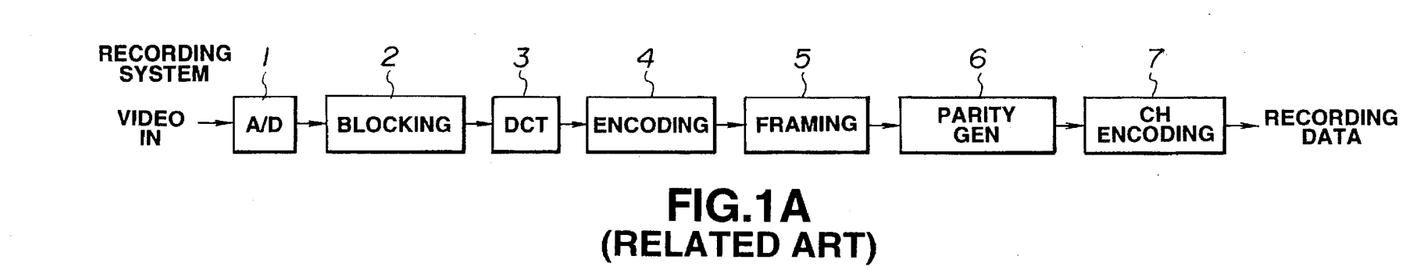
FIG. 1 is a block diagram showing an arrangement of a circuit of a general digital VTR.
Figure 1B:
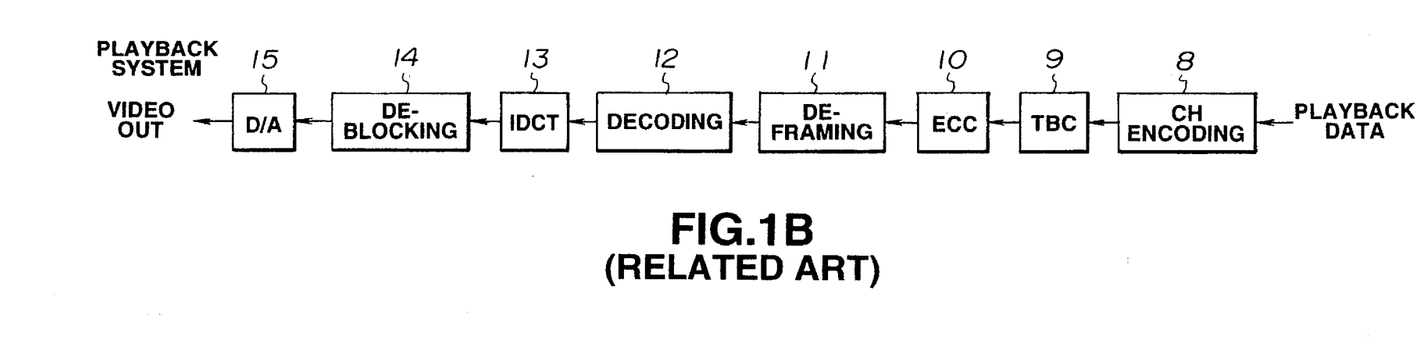

For example, a digital VTR employing efficient coding due to discrete cosine transform (DCT) and variable length coding (VLC) is provided with a recording system and a playback system as shown in FIG. 1.

In the recording system of the digital VTR shown in FIG. 1, the following processing is implemented. An input analog-component video signal (Y, R-Y, B-Y) is converted into a digital-component video signal by an A/D converter 1, and is then divided into blocks of data, each block having a unit of 8×8, that is, 8 samples in the horizontal direction and 8 lines in the vertical direction, using a frame memory in a blocking circuit 2. The data is shuffled and Y/C multiplexed. The data of an 8×8 unit is processed with DCT by a DCT circuit 3, whereby the data of a time amplitude domain is converted into data of a frequency domain. In addition, the data processed with DCT is re-quantized by an encoder 4, and is processed with VLC such as two-dimensional Huffman coding, so as to be compressed. The VLC by the encoder 4 is so controlled as to have a fixed length for each buffering unit constituted by a predetermined number of DCT blocks, for example, 30 DCT blocks. The data processed with DCT is framed to have a product coding structure of error correction coding (ECC) by a framing circuit 5, and is provided with a parity by a parity generating circuit 6. The data is then channel-coded by a channel encoder 7 into a form suitable for magnetic recording and playback, and is recorded in a magnetic tape, not shown, as serial recording data.

On the other hand, in the playback system, the following processing is implemented. A playback data played back from a magnetic tape is processed with data detection and serial/parallel conversion by a channel decoder 8, and with time-base correction by a time-base correction (TBC) circuit 9. The playback data is then processed with error correction by an error correction (ECC) circuit 10, and is decomposed into a word unit of VLC by a de-framing circuit 11. The data is decoded and inversely quantized by a decoder 12, and is processed with inverse DCT by an inverse DCT circuit 13, so as to be data of an 8×8 unit. The data is processed with de-shuffling, Y/C separation and data interpolation by a de-blocking circuit 14, and is converted into an analog signal by a D/A converter 15, so as to be outputted as an analog-component video signal.

Figure 2:
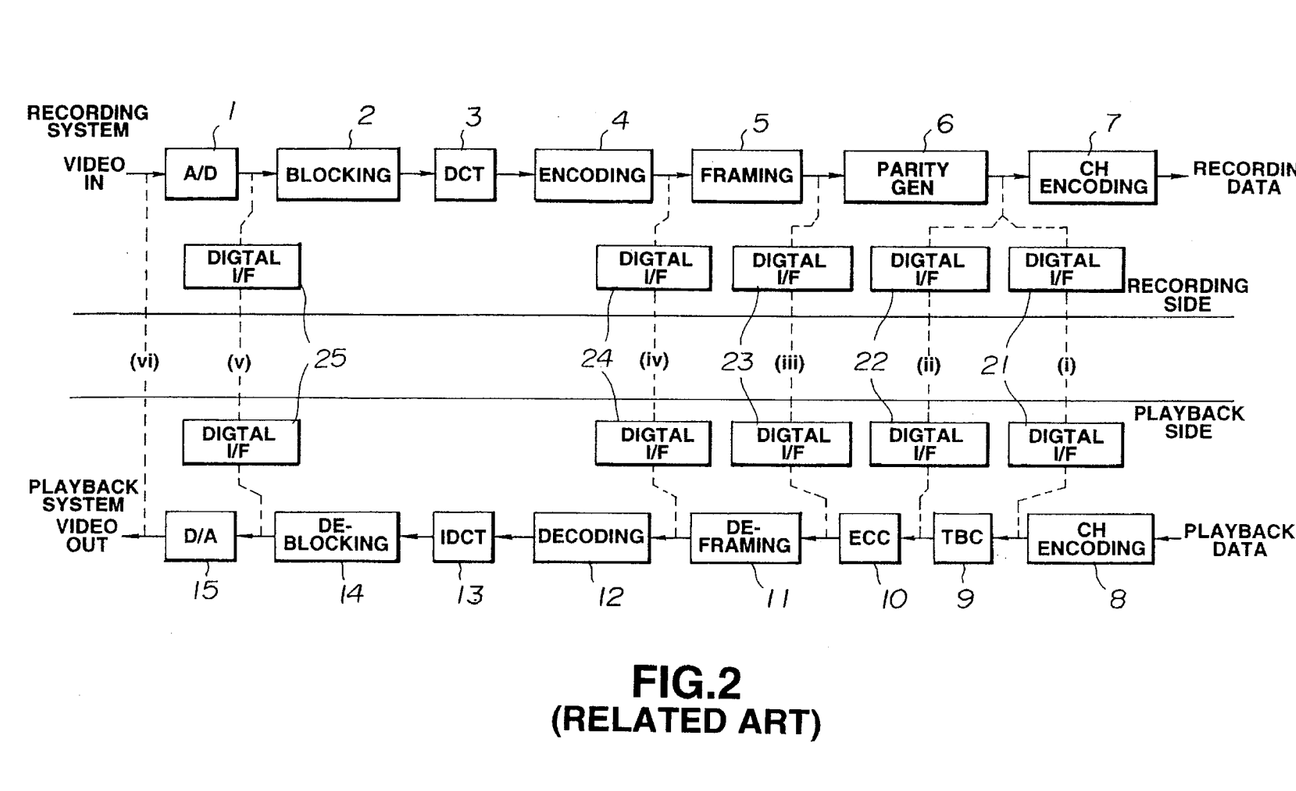
FIG. 2 is a block diagram for illustrating a various dubbing methods in the digital VTR.

As this method of dubbing video signals in the digital VTR, the first to sixth methods indicated by (i) to (vi) in FIG. 2 can be considered.

With the first method (i), data which has been channel-decoded by the channel decoder 8 on a playback unit side is entered in the channel encoder 7 on a recording unit side via a digital interface 21, thus carrying out digital dubbing.

With the second method (ii), data which has been processed with time-base correction by the time-base correction circuit 9 on the playback unit side is entered in the channel encoder 7 on the recording unit side via a digital interface 22, thus carrying out digital dubbing.

With the third method (iii), data which has been processed with error correction by the ECC circuit 10 on the playback unit side is entered in the parity generating circuit 5 on the recording unit side via a digital interface 23, thus carrying out digital dubbing.

With the fourth method (iv), data which has been de-framed by the de-framing circuit 11 on the playback unit side is entered in the framing circuit 5 on the recording unit side via a digital interface 24, thus carrying out digital dubbing.

With the fifth method (v), a digital-component video signal produced by the de-blocking circuit 14 on the playback unit side is entered in the blocking circuit 2 on the recording unit side via a digital interface 25, thus carrying out digital dubbing.

With the sixth method (vi), an analog-component video signal produced by the D/A converter on the playback unit side is entered in the A/D converter 1 on the recording unit side, thus carrying out conventional analog dubbing.

However, with the first method (i), among the first to sixth methods (i) to (vi) considered to be the methods of dubbing video signals in the digital VTR, the error correction by the error correction circuit 10 is not implemented on the playback unit side. Therefore, errors in playback are accumulated by repeated dubbing. In addition, since a part having no playback signal is copied as it is at the time of variable-speed playback, a problem remains that a normal playback picture cannot be produced by playing back a copied tape.

With the second method (ii), since the time-base correction is implemented by the TBC circuit 9 on the playback unit side, a playback signal of the same data format as in normal playback can be produced even in the variable-speed playback. However, without the error correction on the playback unit side, the problem of propagation of errors due to repeated dubbing cannot be solved.

With the fifth method (v), the high-speed digital interface 25 with a high transmission rate of 216 Mbps is needed for dubbing a non-compressed digital-component video signal. In addition, there is a risk of deterioration of picture quality due to DCT.

Furthermore, with the sixth method (vi), since analog dubbing for dubbing an analog-component video signal is carried out, a problem remains of deterioration of picture quality due to dubbing.

OBJECT AND SUMMARY OF THE INVENTION

In view of the above-described problem of the method of dubbing video signals in the digital VTR, it is an object of the present invention to provide a method of dubbing compressed digital video signals in an apparatus for efficient coding and recording/playback of video signals, whereby a digital interface used for dubbing can easily be realized.

It is another object of the present invention to provide a method of dubbing digital video signals, whereby dubbing can be realized at a low transmission rate without causing deterioration of picture quality.

It is another object of the present invention to provide a method of dubbing digital video signals, whereby dubbing can be realized in variable-speed playback.

It is still another object of the present invention to provide a method of dubbing digital video signals, whereby error correction for transmission can be simplified.

Thus, according to the present invention, there is provided a method of dubbing compressed digital video signals in an apparatus for efficient coding and recording/playback of video signals, the method including the steps of: padding error data into data of the compressed digital video signals with respect to an error uncorrectable in error correction of playback on a playback unit side, adding a parity for transmission, and transmitting the data to a recording unit side; and padding error data into the data of the compressed digital video signals with respect to an error uncorrectable in error correction of transmission on the recording unit side, adding a parity for recording, and recording the data in a recording medium.

According to the present invention, there is also provided a method of dubbing compressed digital video signals in an apparatus for efficient coding and recording/playback of video signals, the method including the steps of: implementing time-base correction of playback data of the compressed digital video signals on a playback unit side; and transmitting the digital video signals processed with time-base correction from the playback side to a recording unit side, in a transmission format which is a data format of the compressed digital video signals among transmission formats and is the same as a data format of the compressed digital video signals in a recording format.

According to the present invention, there is also provided a method of dubbing compressed digital video signals in an apparatus for efficient coding and recording/playback of video signals, the method including the steps of: padding error data into data of the compressed digital video signals and digital audio signals with respect to an error uncorrectable in error correction of playback on a playback unit side, adding a parity for transmission, and transmitting the data to a recording unit side; and padding error data into the data of the compressed digital video signals and the digital audio signals with respect to an error uncorrectable in error correction of transmission on the recording unit side, adding a parity for recording, and recording the data in a recording medium.

According to the present invention, there is also provided a method of dubbing compressed digital video signals in an apparatus for efficient coding and recording/playback of video signals, the method including the steps of: padding error data into data of the compressed digital video signals and sub-code signals with respect to an error uncorrectable in error correction of playback on a playback unit side, adding a parity for transmission, and transmitting the data to a recording unit side; and padding error data into the data of the compressed digital video signals and the sub-code signals with respect to an error uncorrectable in error correction of transmission on the recording unit side, adding a parity for recording, and recording the data in a recording medium.

The above, and other objects, features and advantages of the invention, will be apparent in the following detailed description of illustrative embodiments thereof which are to be read in connection with the accompanying drawings.

DESCRIPTION OF PREFERRED EMBODIMENTS

A preferred embodiment of the method of dubbing digital video signals according to the present invention will now be described in detail with reference to the accompanying drawings.

Figure 3:
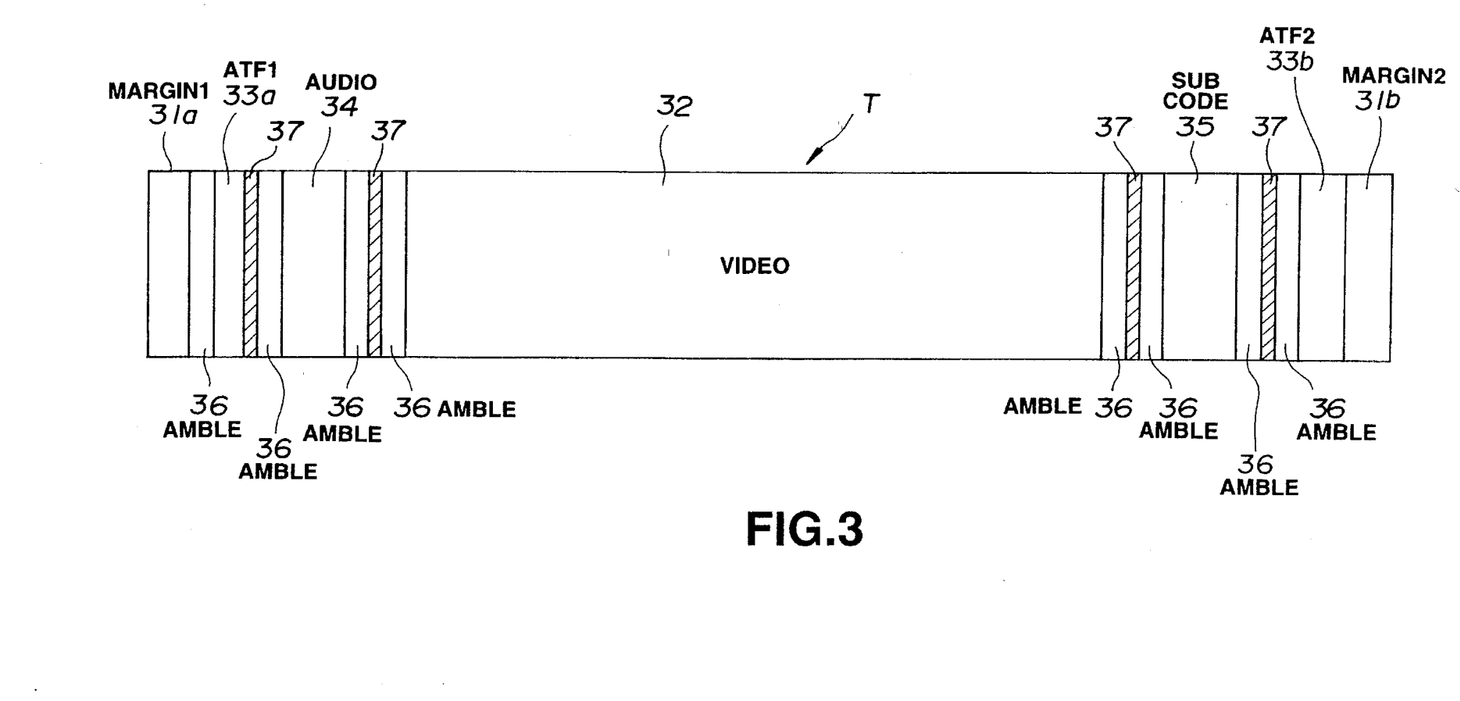
FIG. 3 is a diagram showing a track format of a digital VTR in a dubbing system for carrying out digital dubbing according to the present invention.

First, in the embodiment to be described hereinbelow, a recording format of one helical track of a magnetic tape used for a dubbing system has an arrangement shown in FIG. 3. In FIG. 3, preliminary marginal areas 31a, 31b are allocated on both ends of the recording format serving until a magnetic tape and a magnetic head are in a state of stable contact, and a video area 32 in which actual picture data is recorded is allocated at the center of a helical track T. A first ATF area 33a and an audio area 34 in which voice data are recorded is allocated between the marginal area 31a and the video area 32, and a sub-code area 35 and a second ATF area 33b are allocated between the marginal area 31b and the video area 32.

AMBLE areas 36 are allocated between respective areas, for example, at the tops of the first and second ATF areas 33a, 33b, on both sides of the audio area 34, on both sides of the video area 32 and on both sides of the sub-code area 35. Areas 37 indicated by slant lines are block gap areas.

Sub-code signals such as time and address are recorded in the sub-code area 35, and ATF signals for tracking correction are recorded in the first and second ATF areas 33a, 33b.

Figure 4A:
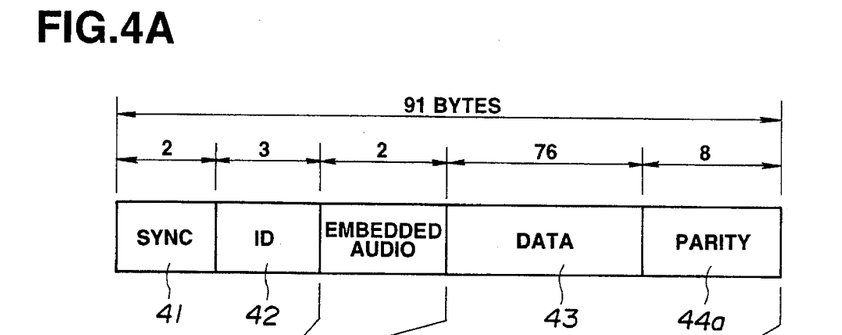
FIG. 4 is a schematic diagram showing a coding structure of picture data recorded in a video area of a recording track of a magnetic tape, in the above-mentioned digital VTR.
Figure 4B:
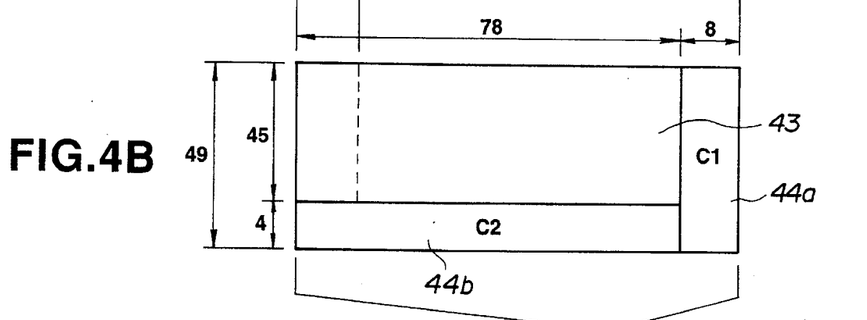
Figure 4C:
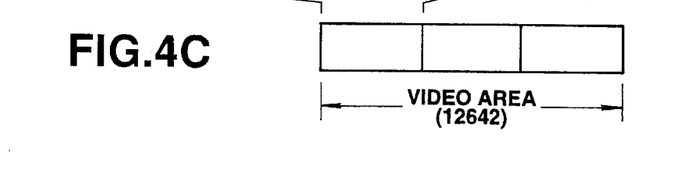
Figure 5A:
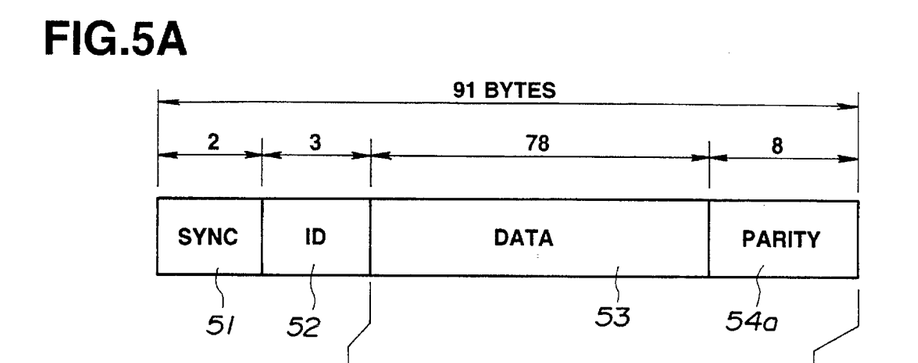
FIG. 5 is a schematic diagram showing a coding structure of voice data recorded in an audio area of the recording track of the magnetic tape, in the above-mentioned digital VTR.
Figure 5B:
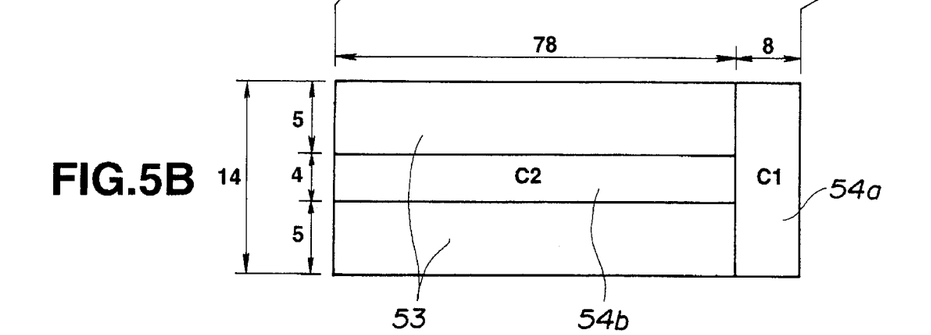
Figure 6A:
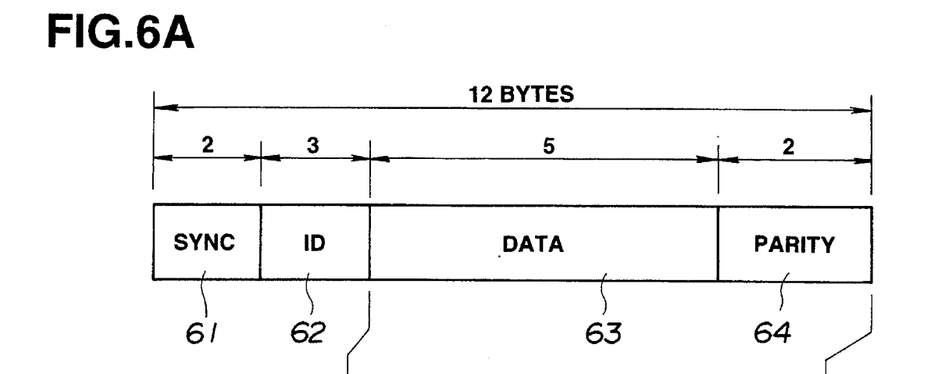
FIG. 6 is a schematic diagram showing a coding structure of sub-code data recorded in a sub-code area of the recording track of the magnetic tape, in the above-mentioned digital VTR.
Figure 6B:
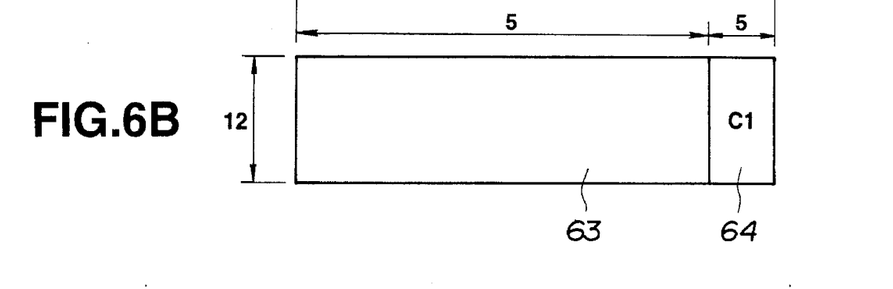

Among the data recorded in the respective areas, the picture data recorded in the video area 32, the voice data recorded the audio area 34, and the sub-code data recorded in the sub-code area 35 have coding structures as shown in FIGS. 4 to 6, respectively. That is, the picture data has a coding structure in which three frames are arrayed, each frame having 49 blocks arrayed in a direction of column, each block having 91 bytes in a direction of row, as shown in FIG. 4.

Each of the blocks is constituted by SYNC data 41 of a 2-byte structure taking transmission synchronization, ID data 42 of a 3-byte structure, main data 43 of a 78-byte structure, and a first parity 44a of an 8-byte structure. Forty-five of the blocks having such constitution, to be referred to as picture data blocks as a matter of convenience, are arrayed in the direction of column. The remaining blocks have a coding structure in which a second parity 44b of a 78-byte structure in the direction of row and the first parity 44a of an 8-byte structure are arrayed. Four of the blocks having such constitution are arrayed in the direction of column.

Then, the voice data has a frame structure in which, for example, 14 blocks, are arrayed in the direction of column, each block having 91 bytes in the direction of row, as shown in FIG. 5.

Each of the blocks is constituted by SYNC data 51 of a 2-byte structure taking transmission synchronization, ID data 52 of a 3-byte structure, main data 53 of a 78-byte structure, and a first parity 54a of an 8-byte structure. A total of 10 of the blocks having such constitution, to be referred to as voice data blocks as a matter of convenience, are arrayed, that is, 5 blocks from the top row and 5 blocks from the last row. The remaining blocks have a coding structure in which a second parity 54b of a 78-byte structure in the direction of row and the first parity 54a of an 8-byte structure are arrayed. Four of the blocks having such constitution are arrayed in the direction of column.

Further, the sub-code data has a frame structure in which, for example, 12 blocks are arrayed in the direction of column, each block having 12 bytes in the direction of row, as shown in FIG. 6.

Each of the blocks is constituted by SYNC data 61 of a 2-byte structure taking transmission synchronization, ID data 62 of a 3-byte structure, main data 63 of a 5-byte structure, and a parity 64 of a 2-byte structure for the main data.

The first embodiment of the present invention will now be described with reference to FIGS. 3 to 10.

Figure 7:
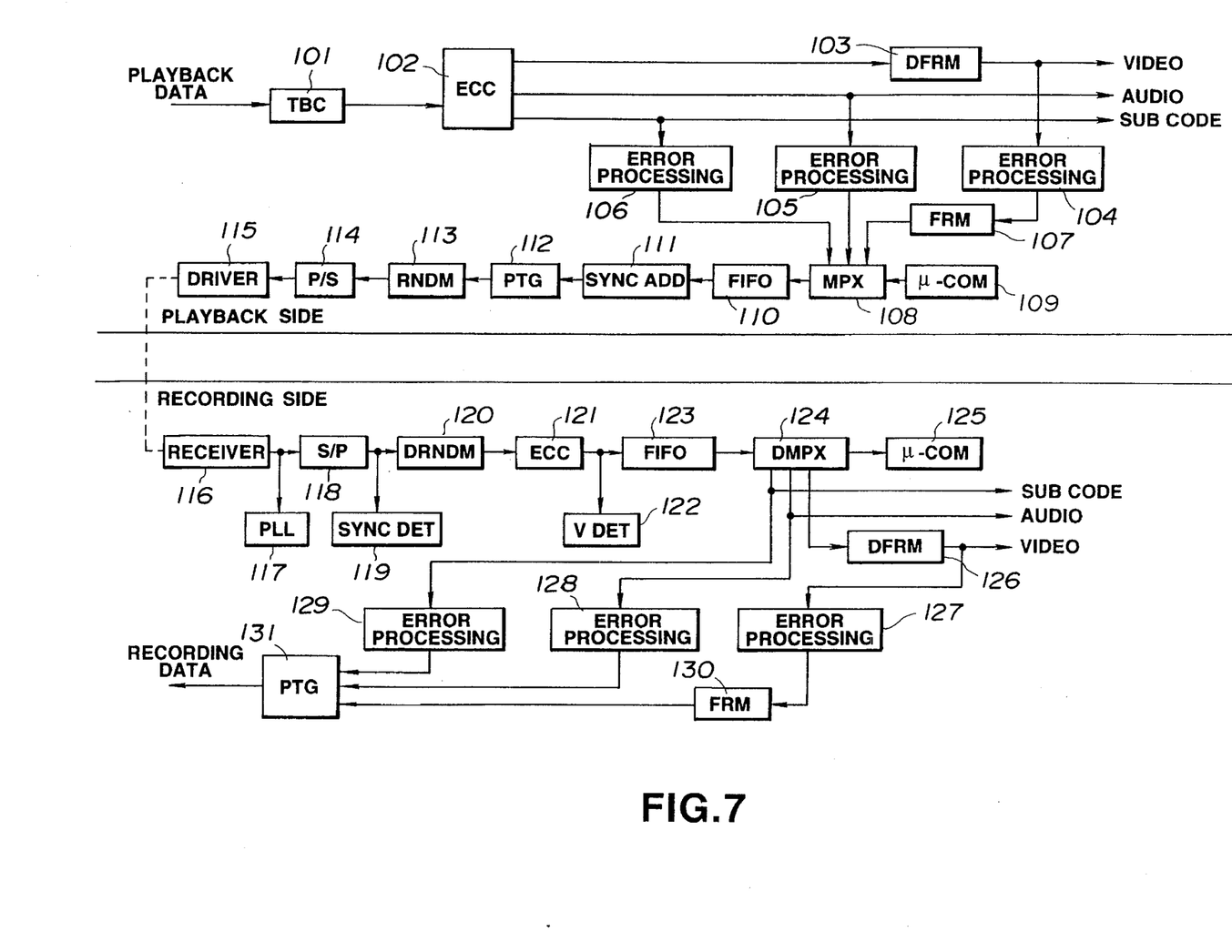
FIG. 7 is a block diagram showing an arrangement of essential portions of a dubbing system for illustrating the first embodiment of the present invention.

In FIG. 7, a time-base correction circuit 101 on a playback unit side is supplied with playback data which has been channel-decoded by a channel decoder not shown, as shown in FIG. 7. The playback data processed with time-base correction by the time-base correction circuit 101 is processed with error correction by an error correction (ECC) circuit 102. The ECC circuit 102 corrects errors generated in recording and playback systems, and outputs an error flag for an uncorrectable error. Picture data processed with error correction by the ECC circuit 102 is supplied to an error processing circuit 104 via a de-framing circuit 103, and is supplied to a decoder, not shown, where the picture data is processed with playback picture signal processing and is then outputted as a monitor picture signal. Audio data processed with error correction by the ECC circuit 102 is supplied to an error processing circuit 105, and is supplied to a decoder, not shown, where the audio data is processed with playback signal processing and is then outputted as a monitor audio signal. Sub-code data processed with error correction by the ECC circuit 102 is supplied to an error processing circuit 106, and is supplied to a decoder, not shown, where the sub-code data is processed with playback processing.

The error processing circuit 104 implements error processing in which, when an error uncorrected by the ECC circuit 102 remains in the picture data processed with de-framing supplied from the de-framing circuit 103, data with its variable length coding unable to be decoded because of a residual error is replaced with a predetermined error code, for example, all "0" or all "1," on the basis of the error flag indicating the residual error.

The picture data processed with error processing by the error processing circuit 104 is framed to have a product coding structure for error correction by a framing circuit 107, and is then supplied to a multiplexer 108.

Figure 8A:
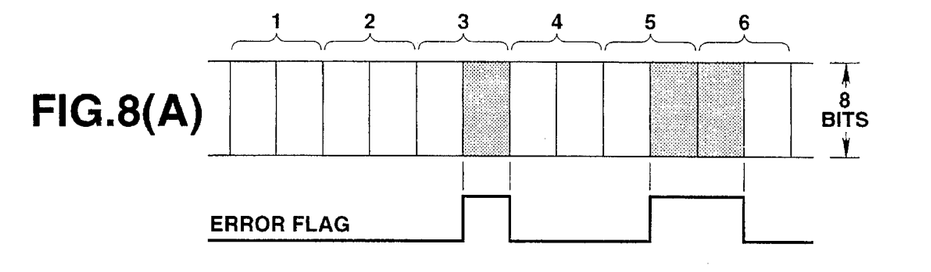
FIG. 8 is a schematic diagram for illustrating error processing for audio data of 16 bits in the first embodiment.
Figure 8B:
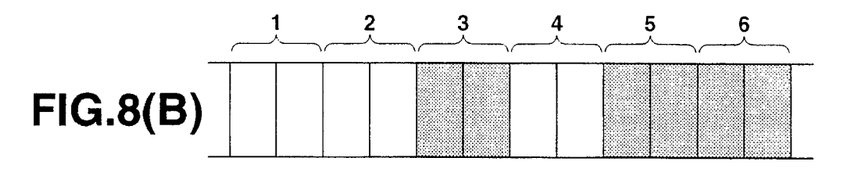
Figure 9A:
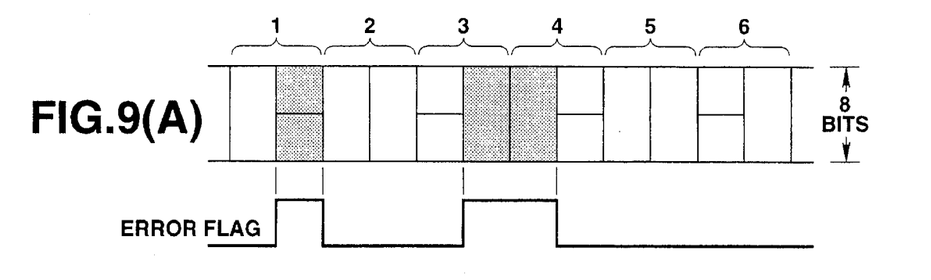
FIG. 9 is a schematic diagram for illustrating error processing for audio data of 12 bits in the first embodiment.
Figure 9B:
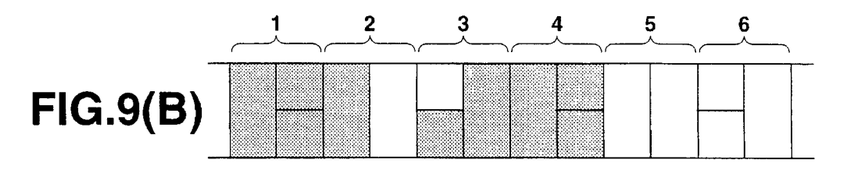
Figure 10A:
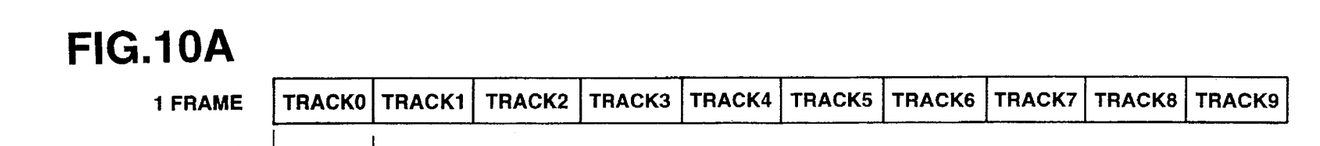
FIG. 10 is a schematic diagram showing a transmission format of dubbing data in the first embodiment.
Figure 10B:
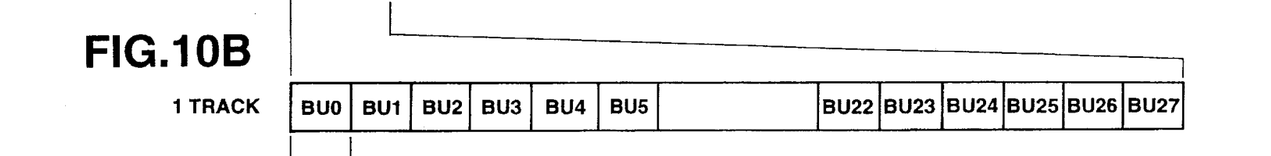
Figure 10C:
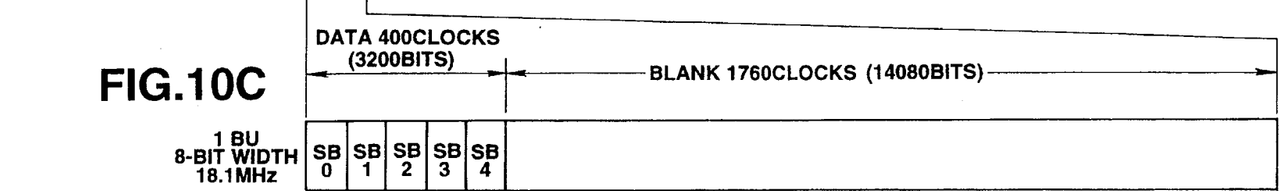
Figure 10D:
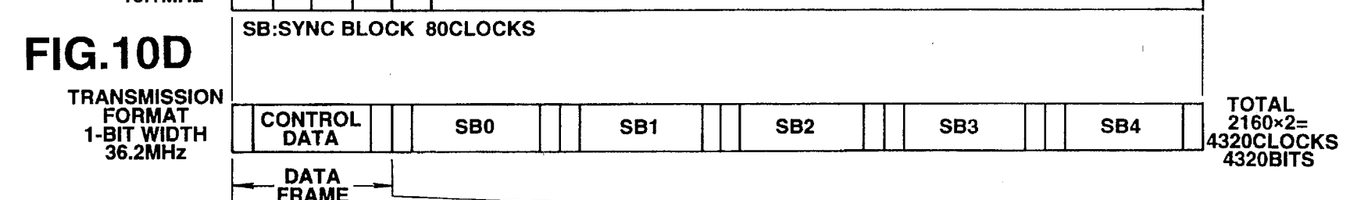
Figure 10E:
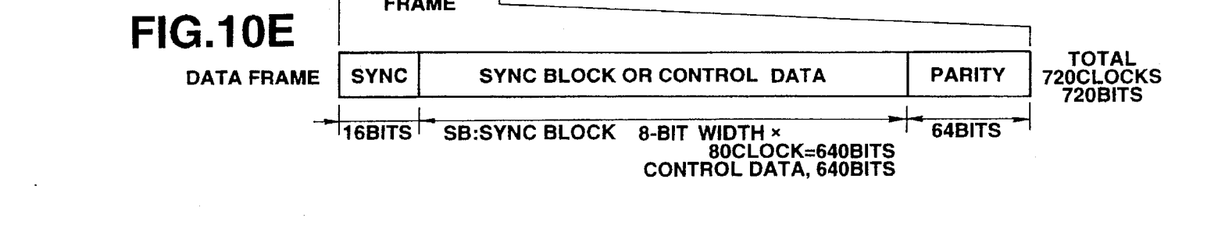

The error processing circuit 105 implements error processing in which error data is replaced with a predetermined error code by word unit on the basis of an error flag indicating a residual error in the audio data processed with error processing by the ECC circuit 102. That is, when an error of 1 byte remains in the third, fifth and sixth words of audio data of 2 bytes (16 bits) as indicated by slant lines in FIG. 8A, respectively, the third, fifth and sixth words are replaced with the predetermined error codes on the basis of the error flag indicating the residual error by 1-byte unit, as shown in FIG. 8B. In the case of audio data of 1.5 bytes (12 bits), when an error of 1 byte over the first and second words and errors of 1 byte in the fourth and fifth words, respectively, remain as indicated by slant lines in FIG. 9A, the first, second, fourth and fifth words are replaced with the predetermined error codes on the basis of the error flag indicating the residual errors by 1-byte unit, as shown in FIG. 9B.

Meanwhile, the error processing circuit 105 may implement processing for interpolating error data by word unit, instead of replacing the error data with the predetermined error code by word unit on the basis of the error flag indicating the residual error, for the audio data processed with error correction by the ECC circuit 102.

The audio data processed with error correction by the error processing circuit 105 is supplied to the multiplexer 108.

Further, the error processing circuit 106 implements error processing in which error data in the sub-code data processed with error correction by the ECC circuit 102 is replaced with the predetermined error code on the basis of an error flag indicating the residual error.

The sub-code data has the main data of 5 bytes with the parity code of 2 bytes added thereto, as described above, and cannot be used if it has an uncorrectable error of even 1 byte in the main data. Thus, ITEM data "11111111" is employed as an error code among ITEM data allocated to the first byte of the main data. The error processing circuit 106 implements error processing by replacing the first byte of the main data with the error code "11111111."

The sub-code data processed with error processing by the error processing circuit 106 is supplied to the multiplexer 108.

It is noted that the error processing circuits 104, 105, 106 may replace, with the error codes, error data which cannot be corrected by an error correction (ECC) circuit 121 on the recording unit side to be later described.

The picture data supplied to the multiplexer 108 is passed through the de-framing circuit 103 and the framing circuit 107, and therefore is delayed in comparison with the audio data and the sub-code data. Thus, the ECC circuit 102 outputs the audio data and the sub-code data later than the picture data, for compensating the above-mentioned delay of the picture data.

The picture data, audio data and sub-code data which have been processed with the error processing are time-division multiplexed along with control data from a micro-computer 109 by the multiplexer 108, and are converted to a transmission format via a FIFO memory 110.

Further, the data converted to the transmission format are provided with a synchronization signal SYNC for transmission by a synchronization adding circuit 111, and are provided with a parity for transmission by a parity generator 112. The data are then passed through a randomization (RNDM) circuit 113 and a parallel/serial (P/S) converter 114, and are outputted as optical or electrical serial data from a driver 115.

In this embodiment, one frame is constituted by data of 10 tracks (track 0 to track 9), and data of one track is constituted by data of 28 buffering units (BU0 to BU27). Data of one buffering unit is constituted by data of 5 sync blocks (SB0 to SB4) of compressed data, and data of one sync block is constituted by 620 bits (80 bytes). The playback unit side is actuated at a clock of 18.1 MHz, so as to process data of one buffering in a period of 2160 clocks, thus outputting the serial data converted to the transmission format at a clock of 36.2 MHz.

On the other hand, on the recording unit side, the serial data transmitted from the playback unit side via the driver 115 is received by a receiver 116, and a clock necessary for reception is produced from the serial data by a PLL circuit 117 while the serial data is converted into parallel data by a serial/parallel (S/P) converter 118.

A synchronization detection circuit 119 detects a synchronization signal SYNC for transmission, from the parallel data produced by the S/P converter 118, and outputs timing necessary for processing on later stages. In addition, the parallel data produced by the S/P converter 118 is supplied via a de-randomization (DRNDM) circuit 120 to an error correction (ECC) circuit 121 for transmission.

The ECC circuit 121 corrects errors generated in a transmission path, and outputs an error flag for an uncorrectable error similarly to the ECC circuit 102 on the playback unit side.

A V-synchronization detection circuit 122 detects a vertical synchronization signal from the data processed with error correction by the ECC circuit 121, The recording unit side is actuated on the basis of the vertical synchronization signal detected by the V-synchronization detection circuit 122, thereby taking frame synchronization with the playback unit side.

Further, the data processed with error correction by the ECC circuit 121 is returned from the transmission format to the signal processing format by a FIFO memory 123 and a de-multiplexer 124. Control data from the de-multiplexer 124 is supplied to a micro-computer 125 for system control.

The picture data, audio data and sub-code data outputted from the de-multiplexer 124 are processed with error processing perfectly similar to that of the playback unit side, whereby error data is replaced with an error code in accordance with the error flag from the ECC circuit 121. The above-mentioned picture data, audio data and sub-code data are then provided with a new parity for recording by a parity generator 131, and are supplied to a channel encoder via an MPX circuit for recording, not shown, so as to be recorded in a magnetic tape as dubbing data.

In a copy tape produced by the above-described digital dubbing, the uncorrectable error generated in the dubbing has its data replaced with the error code, and therefore is concealed to be outputted to a monitor. Accordingly, even through repeated dubbing, the error is concealed, and thus does not appear in the picture.

In this manner, when both the error of playback and the error in the transmission path are uncorrectable, the error data are replaced with the error codes in error processing, and a new parity is added to the data, Thus, these errors can be concealed similarly to the uncorrectable error generated in playing back the errors next time.

Next, a second embodiment of the present invention will be described with reference to FIGS. 11 and 12.

Figure 11:
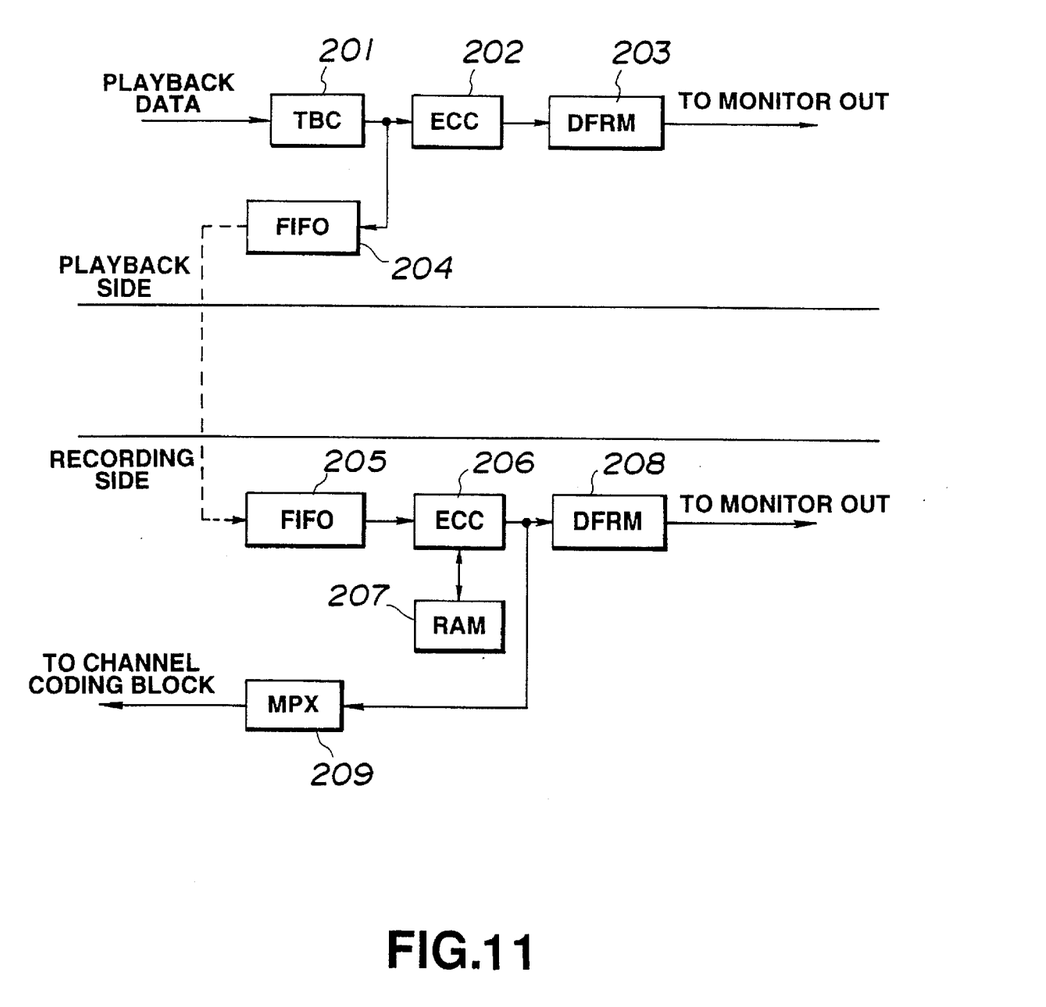
FIG. 11 is a block diagram showing an arrangement of essential portions of a dubbing system for illustrating the second embodiment of the present invention.
Figure 12:
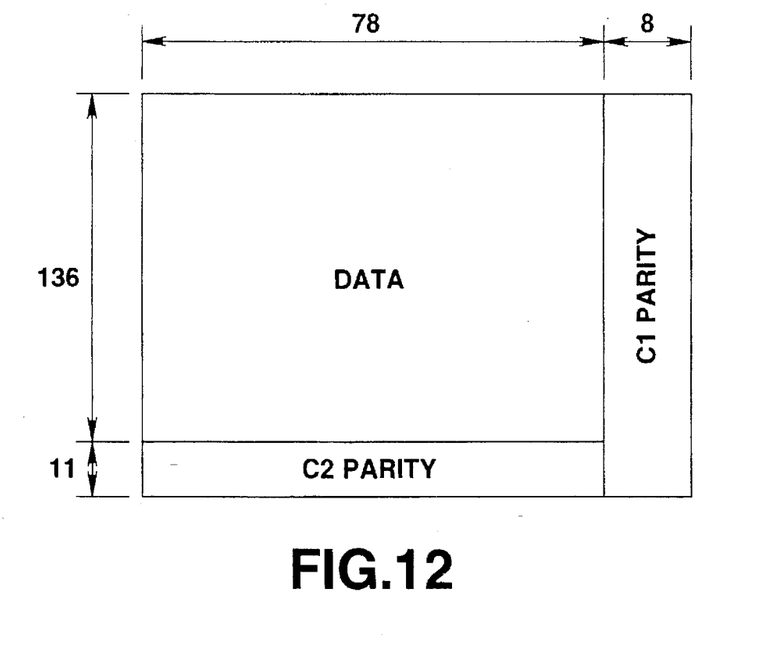
FIG. 12 is a schematic diagram showing a coding structure of picture data dubbed in the second embodiment.

In FIG. 11, a time-base correction circuit 201 on the playback unit side is supplied with playback data which has been channel-decoded by a channel decoder, not shown. The playback data processed with time-base correction by the time-base correction circuit 201 is processed with error correction by an error correction circuit 202, and is supplied via a de-framing circuit 203 to a decoder, not shown, where the playback data is processed with playback picture signal processing and is outputted as a monitor signal.

On the other hand, the playback data processed with time-base correction by the time-base correction circuit 201 is inputted to a FIFO memory 204, then converted to a format in a transmission path, and is transmitted to the recording side as a dubbing output.

In the present second embodiment, the recording format shown in FIG. 3 in the recording system of the digital VTR is employed as the transmission format in the transmission path. Since an ATF signal need not be transmitted in the transmission path, a control signal is transmitted during a period of an ATF area. The transmission rate is set to 40.5 Mbps, which is three times the sampling frequency of the picture of 13.5 Mpbs. In the recording system, for example, a product coding structure of RS (86, 78)×RS (147, 136), as shown in FIG. 12, is adopted for error prevention. The playback data to which parities C1, C2 of the product coding structure for error prevention are added is transmitted via the FIFO memory 204 to the recording unit side.

On the recording unit side, a clock necessary for reception is produced from the received data by a PLL circuit, not shown, and the data is decoded by this clock, so as to be written in a FIFO memory 205. From the FIFO memory 205, the data is read out at a timing corresponding to error correction in the following error correction circuit 206. The error correction circuit 206 implements error correction, using a RAM 207, for the data read out from the FIFO memory 205. That is, this error correction circuit 206 carries out error correction for the product coding of RS (86, 78)×RS (147, 136) shown in FIG. 12. Through the error correction processing, the error in playback and the error generated in the transmission path on the playback unit side can be corrected.

The picture data alone of the data processed with error correction by the error correction circuit 206 is supplied, along with error position data, via a de-framing circuit 208 to a decoder, not shown, where the picture data is processed with playback picture signal processing, and is outputted as a monitor signal.

Also, the picture data of the data processed with error processing by the error correction circuit 206 is supplied, along with parity data produced by the error correction circuit 206, via an MPX circuit 209 for recording to a channel decoder, not shown, and thus is recorded in a magnetic tape as dubbing data.

Next, a third embodiment of the present invention will be described with reference to FIG. 13.

Figure 13:
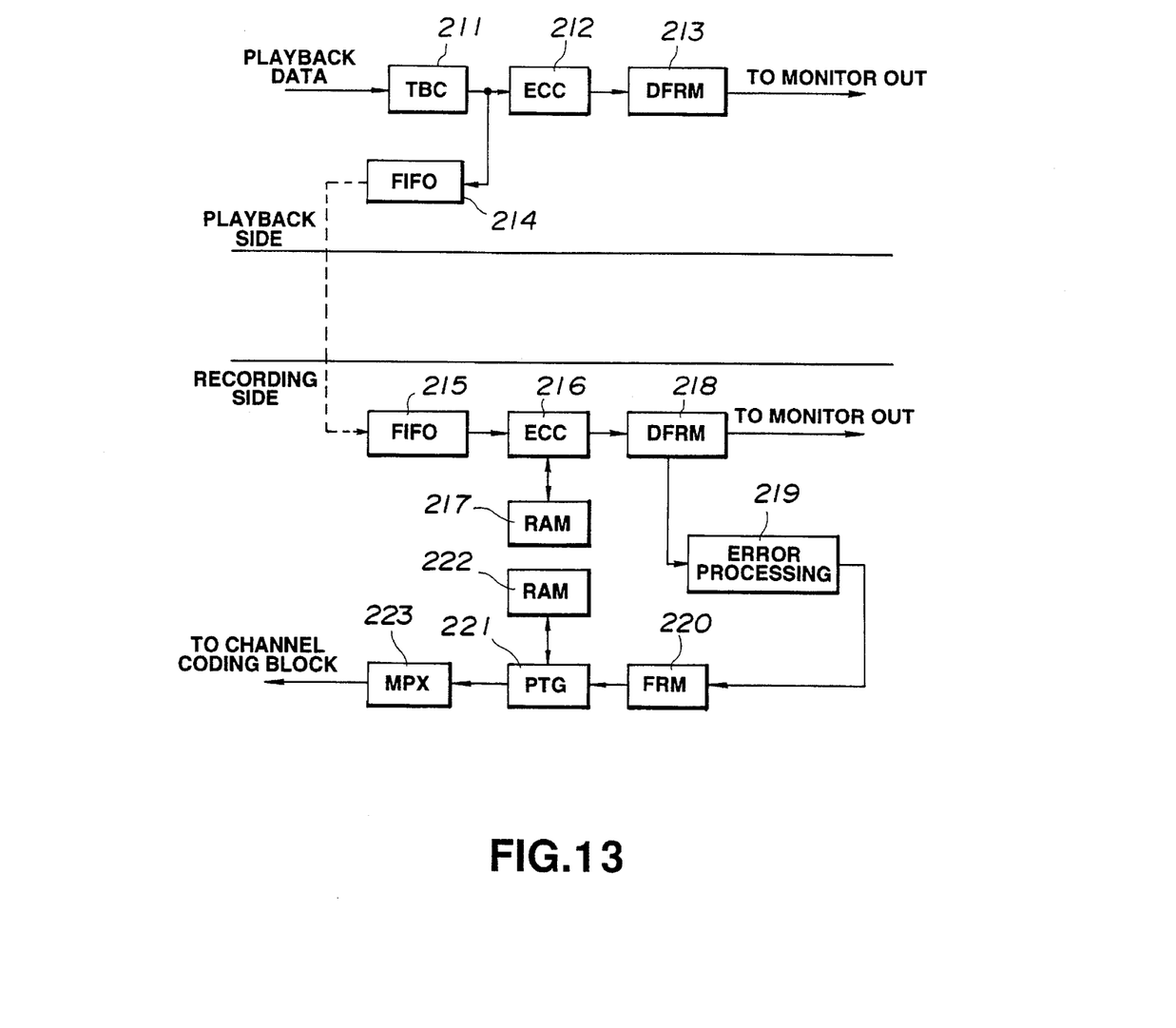
FIG. 13 is a block diagram showing an arrangement of essential portions of a dubbing system for illustrating the third embodiment of the present invention.

In FIG. 13, a time-base correction circuit 211 is supplied with playback data which has been channel-decoded by a channel decoder, not shown. The playback data processed with time-base correction by the time-base correction circuit 211 is processed with error correction by an error correction circuit 212, and is supplied via a de-framing circuit 213 to a decoder, not shown, where the playback data is processed with playback picture signal processing, and is outputted as a monitor signal.

Also, the playback data processed with time-base correction by the time-base correction circuit 211 is inputted to a FIFO memory 214, then converted to a format in a transmission path, and is transmitted to the recording unit side as a dubbing output.

In the present third embodiment, also, the recording format in the recording system of the digital VTR is adopted for the transmission format in the transmission path. A control signal is transmitted during a period of an ATF area. The transmission rate is set to 40.5 Mbps. The playback data to which the parities C1, C2 of the product coding structure adopted in the recording system are added is transmitted to the recording unit side via the FIFO memory 214.

On the recording side, a clock necessary for reception is produced from the received data by a PLL circuit, not shown, and the data is decoded by this clock, so as to be written in a FIFO memory 215. From the FIFO memory 215, the data is read out at a timing corresponding to error correction in the following error correction circuit 216. The error correction circuit 216 implements error correction of the product coding structure using a RAM 217 for the data read out from the FIFO memory 215, thereby correcting the error in playback and the error generated in the transmission path on the playback unit side.

The picture data of the data processed with error correction by the error correction circuit 216 is supplied, along with error position data, via a de-framing circuit 218 to a decoder, not shown, where the picture data is processed with playback picture signal processing, and is outputted as a monitor signal.

On the other hand, the data which has been de-framed is supplied from the de-framing circuit 218 to an error processing circuit 219. The de-framed data has its error data replaced with an error code in the error processing circuit 219. Then, the data is framed to have a product coding structure for error correction, then provided with a parity of the product coding structure using a RAM 222 by a parity generating circuit 221, and is supplied via a recording MPX circuit 223 to a channel encoder, not shown, so as to be recorded in a magnetic tape as dubbing data.

Both the RAM 217 for error correction and the RAM 222 for parity generation are for producing the product coding, and can be a common unit.

In the second and third embodiments, the playback data processed with time-base correction by the time-base correction circuits 201, 211 are used for the data transmitted from the playback unit sides to the recording sides via the FIFO memories 204, 214 as the dubbing outputs. However, the playback data processed with error correction by the error correction circuits 202, 212 on the later stages can also be transmitted to the recording unit sides via the FIFO memories 202, 212 as the dubbing outputs. In this manner, the playback data processed with error correction on the playback unit side is used as the dubbing output, thereby outputting few playback errors in the transmission path.

Next, a fourth embodiment of the present invention will be described with reference to FIGS. 14 and 15.

Figure 14:
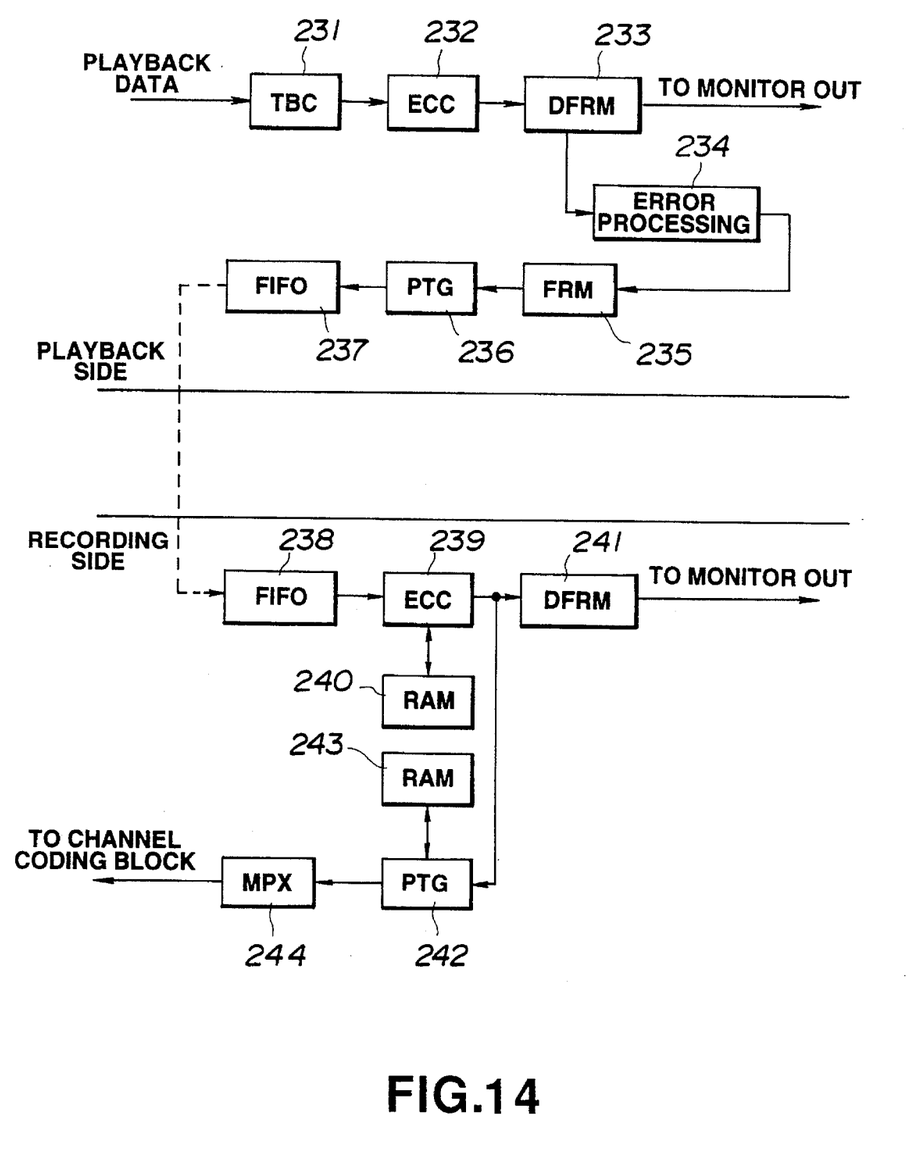
FIG. 14 is a block diagram showing an arrangement of essential portions of a dubbing system for illustrating the fourth embodiment of the present invention.
Figure 15:
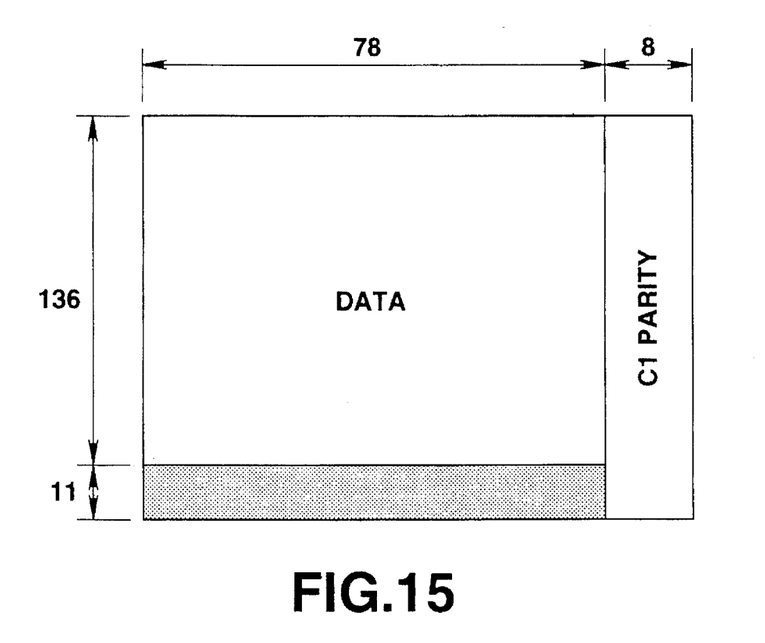
FIG. 15 is a schematic diagram showing a coding structure of picture data dubbed in the fourth embodiment.

In FIG. 14, a time-base correction circuit 231 on the playback unit side is supplied with playback data which has been channel-decoded by a channel decoder, not shown. The playback data processed with time-base correction by the time-base correction circuit 231 is processed with error correction by an error correction circuit 232, and is then supplied via a de-framing circuit 233 to a decoder, not shown, where the playback data is processed with playback picture signal processing, and is outputted as a monitor signal.

Also, the data which has been de-framed is supplied from the de-framing circuit 233 to an error processing circuit 234. The de-framed data has its residual error data replaced with an error code in the error processing circuit 234, then framed to have a product coding structure for error correction by a framing circuit 235, and is provided with a parity for transmission by a parity generating circuit 236. The playback data to which the transmission parity is added is inputted to a FIFO memory 237, then converted to a format in a transmission path, and is transmitted to the recording side as a dubbing output.

In the present fourth embodiment, only one of the parities C1, C2 of the product coding structure adopted in the recording system is adopted for the transmission parity. That is, the parity generating circuit 236 replaces the portion used for the parity C2 with dummy data, as indicated by slant lines in FIG. 15, thus producing the parity C1 as the transmission parity.

In the fourth embodiment, also, the recording format in the recording system of the digital VTR is adopted as a transmission format in the transmission path. A control signal is transmitted during a period of an ATF area. The transmission rate is set to 40.5 Mbps.

On the recording unit side, a clock necessary for reception is produced from the received data by a PLL circuit, not shown, and the data is decoded by this clock so as to be written in a FIFO memory 238. From the FIFO memory 238, the data is read out at a timing corresponding to error correction in the following error correction circuit 239. The error correction circuit 239 implements error correction by the transmission parity C1 using a RAM 240 for the data read out from the FIFO memory 238, thereby correcting the error generated in the transmission path.

The picture data of the data processed with error correction by the error correction circuit 239 is supplied, along with error position data, via a de-framing circuit 241 to a decoder, not shown, where the data is processed with playback picture signal processing, and is outputted as a monitor signal.

Also, the data processed with error correction by the error correction circuit 239 is provided with parities C1, C2 of a product coding structure using a RAM 243 by a parity generating circuit 242 of tile recording system, then supplied via an MPX circuit 244 for recording to a channel encoder, not shown, and is recorded in a magnetic tape as dubbing data.

The generation probability of errors in the transmission path is extremely low compared with the generation probability of errors in the magnetic recording and playback systems. Therefore, the correction capability of the error correction circuit 239 for transmission on the recording unit side may be low, as in the third embodiment, and the error correction circuit 239 and the parity generating circuit 236 on the playback unit side can be simplified. Further, an error detection circuit can be used instead of the error correction circuit 239 for further simplification. The control signal may be provided and received between the playback unit side and the recording unit side, so as to designate, from the recording unit side to the playback unit side, the format of the transmission parity which can be handled on the recording unit side.

Thus, according to the present invention, it is possible to easily realize the, digital interface used for dubbing, to realize dubbing at a low transmission rate without causing deterioration of picture quality, to realize dubbing even in variable-speed playback, and to simplify error correction for transmission.

What is claimed is:

1. Apparatus for dubbing compressed digital video signals reproduced from a record medium, comprising:

reproduction error correction means for correcting errors in said compressed digital video signal reproduced from said record medium and for adding error flags to said compressed digital video signal identifying any uncorrectable errors therein;

first deframing means for deframing said compressed digital video signal to produce a deframed digital video signal;

means for replacing said uncorrectable errors identified by said error flags in said deframed digital video signal with first error data;

first framing means for framing said deframed digital video signal to produce a framed digital video signal;

means for adding first parity data to said framed digital video signal;

transmitting means for transmitting said framed digital video signal to a recording section of said apparatus;

receiving means for receiving, at said recording section, the transmitted digital video signal;

transmission error correction means for correcting errors in the transmitted digital video signal and for adding second error flags to the transmitted digital video signal identifying any uncorrectable errors therein;

second deframing means for deframing said transmitted digital video signal to produce a deframed transmitted digital video signal;

means for replacing said uncorrectable errors identified by said error flags in said deframed transmitted digital video signal with second error data;

second framing means for framing said deframed transmitted digital video signal to produce a framed transmitted digital video signal;

means for adding second parity data to said framed transmitted digital video signal; and recording means for recording said framed transmitted digital video signal on a record medium.

2. The apparatus of claim 1, further comprising means for time-base correcting the reproduced compressed digital video signal; and wherein the reproduction error correction means corrects errors in the time-base corrected digital video signal.

3. The apparatus of claim 1, wherein said means for adding second parity data to the framed transmitted digital video signal adds both C1 and C2 type parity data to the framed transmitted digital video signal, wherein C1 is parity data for each row of data in a digital video signal and C2 is parity data for each column of data in a digital video signal; and said means for adding first parity data to the framed digital video signal adds only C1 type parity data to the framed digital video signal.

4. The apparatus of claim 1, further comprising means for converting said framed digital video signal to a transmission signal having a transmission type format; and wherein said means for adding first parity data adds parity data to said transmission signal.

5. The apparatus of claim 1, further comprising means for converting the framed digital video signal having first parity data added thereto to a transmission signal having a transmission type format; and wherein said transmitting means transmits said transmission signal to said recording section of said apparatus.

6. Method of dubbing compressed digital video signals reproduced from a record medium, comprising the steps of:

correcting errors in said compressed digital video signal reproduced from said record medium;

adding error flags to said reproduced compressed digital video signal identifying any uncorrectable errors therein;

deframing said reproduced compressed digital video signal to produce a deframed digital video signal;

replacing said uncorrectable errors identified by said error flags in said deframed digital video signal with first error data;

framing said deframed digital video signal to produce a framed digital video signal;

adding first parity data to said framed digital video signal;

transmitting said framed digital video signal;

receiving the transmitted digital video signal;

correcting errors in the transmitted digital video signal;

adding second error flags to the transmitted digital video signal identifying any uncorrectable errors therein;

deframing said transmitted digital video signal to produce a deframed transmitted digital video signal;

replacing said uncorrectable errors identified by said error flags in said deframed transmitted digital video signal with second error data;

framing said deframed transmitted digital video signal to produce a framed transmitted digital video signal;

adding second parity data to said framed transmitted digital video signal; and recording said framed transmitted digital video signal on a record medium.

7. The method of claim 6, further comprising the step of time-base correcting the reproduced compressed digital video signal; and wherein the first error correcting step corrects errors in the time-base corrected digital video signal.

8. The method of claim 6, wherein the adding second parity data step is carried out by adding both C1 and C2 type parity data to the framed transmitted digital video signal, wherein C1 is parity data for each row of data in a digital video signal and C2 is parity data for each column of data in a digital video signal; and the adding first parity data step is carried out by adding only C1 type parity data to the framed digital video signal.

9. The method of claim 6, further comprising the step of converting said framed digital video signal to a transmission signal having a transmission type format; and wherein the adding first parity data step adds parity data to said transmission signal.

10. The method of claim 6, further comprising the step of converting the framed digital video signal having first parity data added thereto to a transmission signal having a transmission type format; and wherein the step of transmitting said framed digital video signal is carried out by transmitting the transmission signal.

* * * * *